Patented May 8, 1951

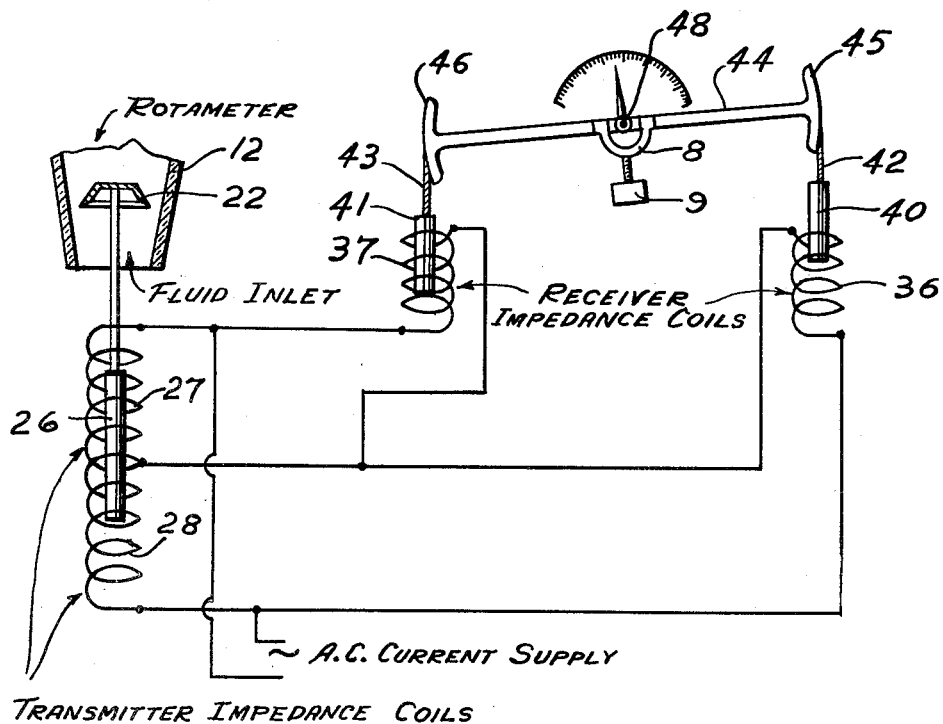

2,551,585

UNITED STATES PATENT OFFICE 2,551,585

MECHANICAL COMPENSATOR FOR REMOTE INDICATING IMPEDANCE CIRCUITS

Fred J. Curran, Philadelphia, Pa., assignor to Fischer & Porter Company, Hatboro, Pa., a corporation of Pennsylvania Application August 31, 1946, Serial No. 694,390

10 Claims. (Cl. 177—351)

The present invention relates to non-symmetrical impedance circuits for remote indication and/or recordation and/or integration of a variable condition, and it relates more particularly to certain new and useful improvements in such impedance circuits.

An object of the present invention is to provide new and improved means for remote indication and/or recordation and/or integration of a variable condition. Another object of the present invention is to provide means for more accurately indicating, recording and integrating, at a remote point, the variations in a variable condition, such as fluid flow-rate, temperature, pressure, etc.

Other objects and advantages of the present invention are apparent in the following detailed description, appended claims and accompanying drawing.

It has been suggested, in the past, to employ impedance circuits for remote indication and/or recordation and/or integration of a variable condition, such as fluid flow-rate, temperature, pressure, etc.

An impedance circuit adapted for remote indication and recordation of fluid flow-rate and for integration of total flow is disclosed, for example, in the co-pending application of Nathaniel Brewer, Serial No. 511,649, filed November 25, 1943, now Patent No. 2,414,086, issued January 14, 1947.

The impedance circuit shown in co-pending Brewer application, Serial No. 511,649 (wherein an armature carried by and vertically movable with a rotameter float, is disposed within a pair of end-to-end transmitter coils, and wherein a pair of side-by-side armatures, supported at the ends of a balance beam are disposed within a pair of side-by-side receiver coils) has proven to be greatly superior to and more accurate than other earlier systems (wherein receiver coils were also arranged in vertical end-to-end alignment with a single receiver armature disposed therewithin).

However, even the circuit shown in co-pending Brewer application Serial No. 511,649 which is the same as the circuit shown in the drawing of the present application may be subject to errors resulting from voltage variations. That is, it has been found that the position of the receiver armatures will change with a change in voltage if they are near the ends of their paths of travel—that is, either the position shown in the present drawing (corresponding to an elevated position of the float 22 and the transmitter armature 26) wherein the beam 44 is tilted counterclockwise and the receiver armature 41 is lowered relative to the receiver coil 37 and the receiver armature 40 is raised relative to the receiver coil 36, or the position (corresponding to a lowered position of the float 22 and the transmitter armature 26) wherein the beam 44 is tilted clockwise and the receiver armature 40 is lowered relative to the receiver coil 36 and the receiver armature 41 is raised relative to the receiver coil 37. On the other hand, if the transmitter and receiver armatures are at their intermediate-point of travel (i. e. corresponding to a centered position of the transmitter armature 26 relative to the transmitter coils 27 and 28 and a horizontal position of the beam 44), voltage variation has no effect upon the position of the receiver armatures. Similarly, if all four coils (two transmitter coils and two receiver coils) and all armatures are identical, voltage variation will have no effect.

It follows, therefore, that when the impedance circuit is symmetrical, there is no change in position due to voltage variations. The completely equal-sided circuit is always symmetrical, whereas the unequal circuit is symmetrical only when the armatures are at their intermediate-points of travel.

Thus, in the circuit disclosed in co-pending Brewer application Serial No. 511,649, it has been found that, as each receiver armature is lowered into one of the side-by-side coils, the pull on the balance beam is equal to the weight of the armature plus a magnetic force which becomes stronger as the armature approaches the center of the coil. Thus, as one of the receiver armatures enters its coil and the other armature recedes from the opposite coil, the pull from the first armature is increasing and that from the second armature is decreasing so that the balance beam is tilted more than would be otherwise the case if this force did not exist.

In order for the balance beam to reach equilibrium, it is necessary that there be a balance of action and reaction forces. The unbalanced acting force (which is the excess pull on the armature further within its coil), is partially offset by the armatures assuming a lower-than-nullpoint position, thereby unbalancing the system electrically and causing a change in the distribution of current in the four legs of the system. This, in turn, produces a reacting magnetic force which results in a lessening of the initial pull on the lower armature, thereby permitting it to return part-way to the nullpoint. Thus, the initial unbalancing force is offset by a reverse acting force produced electrically. Since it is electrically produced, a change in voltage applied to the circuit will change the reacting force proportionately. As a result, the lower armature will assume a new position proportional to the difference between original and reaction forces and this position is, of course, variable with voltage applied.

A number of attempts have been made to correct this error by electrical means but all such previous attempts have proven impractical.

According to the present invention, it has now been found that the addition of a pendulum to the balance beam eliminates the error due to voltage variations by mechanically counteracting the tendency of the lower armature to move downward beyond its theoretical position.

That is, the pendulum is moved to the opposite side of the fulcrum-point and thereby exerts a turning moment opposite that exerted by the lower armature.

It has been found that this counteracting or restoring force of the pendulum almost exactly matches the difference in magnetic pull on the armatures at all positions of the armatures and, therefore, provides accurate compensation. This mechanical compensation leaves the electrical circuit unburdened by the necessity of having to overcome excessive armature pull and, accordingly, the system reaches null balance throughout its entire range. Since the system is at all times balanced electrically at the null position, variations in voltage have no effect upon the position of the receiver armatures and the beam.

For the purpose of illustrating the invention, there is shown in the accompanying drawing one form thereof which is at present preferred, although it is to be understood that the various instrumentalities of which the invention consists can be variously arranged and organized and that the invention is not limited to the precise arrangements and organizations of the instrumentalities as herein shown and described.

Referring to the accompanying drawing, the figure represents a diagrammatic view of an impedance circuit constructed according to the present invention.

In the figure, there is shown diagrammatically an impedance circuit embodying the present invention.

The various parts of the circuit are shown herein only schematically, reference being had to above-mentioned co-pending Brewer application Serial No. 511,649, for a more complete showing and description of the various parts.

As illustrated in the figure, the impedance circuit of the present invention may include upper and lower vertically-disposed end-to-end transmitter coils 27 and 28 respectively and left and right side-by-side receiver coils 37 and 36 respectively.

An elongated transmitter armature 26 is carried by a rotameter float 22 which is disposed for free up-and-down movement within a downwardly-tapered metering tube 12 responsive to variations in upward flow of fluid through said tube 12.

Left and right receiver armatures 41 and 40 respectively are suspended, by cords 43 and 42 respectively from the left and right ends 46 and 45 of a beam 44 having a central pivot or fulcrum 48.

Rigidly suspended from the beam 44, by a yoke 3 is a pendulum weight 9. The weight 9 is directly below the fulcrum 48 when the beam 44 is horizontal, so that it does not exert any turning moment on the beam.

However, when the beam 44 is tilted counter-clock-wise to the position shown in the figure, as the result of an upward movement of the transmitter armature 26 (which in turn results from an upward movement of the float 22 responsive to an increase in the fluid flow-rate upward through the tube 12), the pendulum weight 9 is displaced to the right of the fulcrum point 48 and thereby exerts a clock-wise turning moment on the beam 44 so as mechanically to compensate for the excessive pull exerted by the lower left-hand receiver armature 41, as described above.

It is apparent that, if the fluid flow-rate were to decrease from the predetermined value, the transmitter armature 26 would be moved downward so as to cause a clock-wise tilting of the beam 44, to move the right hand receiver armature 40 to lower position; the pendulum weight 9 thereupon being displaced to the left of the fulcrum 48 so as to exert a counterclock-wise correcting moment upon the beam 44.

As can be seen in the figure, the pendulum weight 9 is screw-threadedly adjustable vertically so that the extent of the turning moment exerted by it can be varied. That is, it is apparent that the further down the pendulum weight 9 is moved, the greater will be the moment exerted by said weight when the beam is tilted. Conversely, the higher the pendulum weight 9, the smaller is the moment exerted by it when the beam is tilted.

As fully described in co-pending Brewer application Serial No. 511,649, movement of the beam 44 may be used to actuate suitable recording and/or integrating mechanism.

While the pendulum weight 9 represents a preferred embodiment of the mechanical compensator of the present invention, other mechanical equivalents thereof are also contemplated. Thus, any mechanical means for exerting a correcting moment in a manner approximating the simple harmonic motion of the pendulum weight 9 could be used in conjunction with the beam 44.

The present invention further contemplates mechanical counterbalancing of electrical-magnetic forces with other arrangements of the various parts of the impedance circuit which might require non-linear compensation, so that the simple harmonic motion of a pendulum would not be entirely accurate.

While, for purpose of illustration, the transmitter armature 26 has been shown as attached to a rotameter float 22, it is obvious that movement of the armature 26 may be made responsive to an element sensitive to their variable conditions, such as temperature, pressure, etc.

The present invention contemplates the use of a mechanical compensator in other types of electrical impedance circuits in addition to that specifically disclosed herein.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described my invention, I claim as new and desire to protect by Letters Patent:

1. In a non-symmetrical electrical impedance circuit for remote quantitative indication of a variable condition, said circuit including a pair of end-to-end transmitter coils and a pair of side-by-side receiver coils operatively connected thereto, a transmitter armature disposed within said transmitter coils, a balanced beam pivotally mounted adjacent said receiver coils, a pair of receiver armatures suspended from the opposite ends of said beam and disposed within said receiver armatures, and means for moving said transmitter armature relative to said transmitter coils responsive to variations in said variable condition thereby to produce variations in electromagnetic force in the receiver coils and to cause corresponding movement of said receiver armatures and tilting of said beam, the positions of said receiver armatures varying with the voltage applied to the circuit when said receiver armatures are displaced from their balanced positions; means for mechanically counterbalancing the electromagnetic forces generated by said receiver coils so as to allow the receiver armatures to follow the transmitter armature in true electrical and mechanical null balance, said counterbalancing means comprising a weight operatively connected to said balanced beam and constructed and arranged to exert an opposing turning moment thereon when said beam is tilted.

2. In a non-symmetrical electrical impedance circuit for remote quantitative indication of a variable condition, said circuit including a pair of end-to-end transmitter coils, and a pair of side-by-side receiver coils operatively connected thereto, a transmitter armature disposed within said transmitter coils, a balanced beam pivotally mounted adjacent said receiver coils, a pair of receiver armatures suspended from the opposite ends of said beam and disposed within said receiver armatures, and means for moving said transmitter armature relative to said transmitter coils responsive to variations in said variable condition thereby to produce variations in electromagnetic force in the receiver coils and to cause corresponding movement of said receiver armatures and tilting of said beam, the positions of said receiver armatures varying with the voltage applied to the circuit when said receiver armatures are displaced from their balanced positions; means for mechanically counterbalancing the electromagnetic forces generated by said receiver coils so as to allow the receiver armatures to follow the transmitter armature in true electrical and mechanical null balance, said counterbalancing means comprising a weight rigidly suspended beneath the pivot of said beam and constructed and arranged to exert a counter-turning movement when said beam is tilted.

3. In a non-symmetrical electrical impedance circuit for remote quantitative indication of a variable condition, said circuit including a pair of end-to-end transmitter coils, and a pair of side-by-side receiver coils operatively connected thereto, a transmitter armature disposed within said transmitter coils, a balanced beam pivotally mounted adjacent said receiver coils, a pair of receiver armatures suspended from the opposite ends of said beam and disposed within said receiver armatures, and means for moving said transmitter armature relative to said transmitter coils responsive to variations in said variable condition thereby to produce variations in electromagnetic force in the receiver coils and to cause corresponding movement of said receiver armatures and tilting of said beam, the positions of said receiver armatures varying with the voltage applied to the circuit when said receiver armatures are displaced from their balanced positions; means for mechanically counterbalancing the electromagnetic forces generated by said receiver coils so as to allow the receiver armatures to follow the transmitter armature in true electrical and mechanical null balance, said counterbalancing means comprising a weight rigidity suspended beneath the pivot of said beam and constructed and arranged to exert a counter-turning moment when said beam is tilted, and means for adjusting said weight vertically relative to said beam.

4. In a non-symmetrical electrical impedance circuit for remote quantitative indication of a variable condition, said circuit including a pair of end-to-end transmitter coils and a pair of side-by-side receiver coils operatively connected thereto, a transmitter armature disposed within said transmitter coils, a balanced beam pivotally mounted adjacent said receiver coils, a pair of receiver armatures suspended from the opposite ends of said beam and disposed within said receiver armatures, and means for moving said transmitter armature relative to said transmitter coils responsive to variations in said variable condition thereby to produce variations in electromagnetic force in the receiver coils and to cause corresponding movement of said receiver armatures and tilting of said beam, the positions of said receiver armatures varying with the voltage applied to the circuit when said receiver armatures are displaced from their balanced positions; means for mechanically counterbalancing the electromagnetic forces generated by said receiver coils so as to allow the receiver armatures to follow the transmitter armature in true electrical and mechanical null balance, said counterbalancing means comprising a pendulum rigidly supported from said beam in right-angular relationship thereto and adapted to exert a turning moment on said beam counter to that exerted by said receiver armatures.

5. In a non-symmetrical electrical impedance circuit for remote quantitative indication of a variable condition, said circuit including a pair of end-to-end transmitter coils and a pair of side-by-side receiver coils operatively connected thereto, a transmitter armature disposed within said transmitter coils, a balanced beam pivotally mounted adjacent said receiver coils, a pair of receiver armatures suspended from the opposite ends of said beam and disposed within said receiver armatures, and means for moving said transmitter armature relative to said transmitter coils responsive to variations in said variable condition thereby to produce variations in electromagnetic force in the receiver coils and to cause corresponding movement of said receiver armatures and tilting of said beam, the positions of said receiver armatures varying with the voltage applied to the circuit when said receiver armatures are displaced from their balanced positions; means for mechanically counterbalancing the electromagnetic forces generated by said receiver coils so as to allow the receiver armatures to follow the transmitter armature in true electrical and mechanical null balance, said counterbalancing means comprising a screw-threaded rod rigidly suspended from said beam in vertical alignment with the pivot thereof and a weight screw-threadly carried by said rod and vertically adjustable therealong whereby a predetermined turning moment is exerted upon said beam when said beam is tilted by said receiver armatures, said predetermined turning moment being opposite to but smaller than the turning moment exerted upon said beam by said receiver armatures.

6. In a non-symmetrical electrical impedance circuit for remote quantitative indication of a variable condition, said circuit including a pair of transmitter coils having at least one transmitter armature mounted in operative juxtaposition thereto and a pair of receiver coils having at least one receiver armature mounted in operative juxtaposition thereto, a pivotally mounted balanced beam, suspension means connecting said receiver armature to one end of said balanced beam, means for moving said transmitter armature relative to said transmitter coils responsive to variations in said variable condition thereby to produce variations in electromagnetic force in the receiver coils and to cause corresponding movement of said receiver armature and tilting of said beam, the position of said receiver armature varying with the voltage applied to the circuit when said receiver armature is displaced from its normal position corresponding to a horizontal position of said balanced beam; means for mechanically counterbalancing the electromagnetic forces generated by said receiver coils so as to allow the receiver armature to follow the transmitter armature in true electrical and mechanical null balance, said counterbalancing means comprising a weight operatively connected to said balanced beam and constructed and arranged to exert an opposing turning moment thereon when said beam is tilted.

7. In a non-symmetrical electrical impedance circuit for remote quantitative indication of a variable condition, said circuit including a pair of transmitter coils having at least one transmitter armature mounted in operative juxtaposition thereto and a pair of receiver coils having at least one receiver armature mounted in operative juxtaposition thereto, a pivotally mounted balanced beam, suspension means connecting said receiver armature to one end of said balanced beam, means for moving said transmitter armature relative to said transmitter coils responsive to variations in said variable condition thereby to produce variations in electromagnetic force in the receiver coils and to cause corresponding movement of said receiver armature and tilting of said beam, the position of said receiver armature varying with the voltage applied to the circuit when said receiver armature is displaced from its normal position corresponding to a horizontal position of said balanced beam; means for mechanically counterbalancing the electromagnetic forces generated by said receiver coils so as to allow the receiver armature to follow the transmitter armature in true electrical and mechanical null balance, said counterbalancing means comprising a weight rigidly suspended beneath the pivot of said beam and constructed and arranged to exert a counter-turning moment when said beam is tilted.

8. In a non-symmetrical electrical impedance circuit for remote quantitative indication of a variable condition, said circuit including a pair of transmitter coils having at least one transmitter armature mounted in operative juxtaposition thereto and a pair of receiver coils having at least one receiver armature mounted in operative juxtaposition thereto, a pivotally mounted balanced beam, suspension means connecting said receiver armature to one end of said balanced beam, means for moving said transmitter armature relative to said transmitter coils responsive to variations in said variable condition thereby to produce variations in electromagnetic force in the receiver coils and to cause corresponding movement of said receiver armature and tilting of said beam, the position of said receiver armature varying with the voltage applied to the circuit when said receiver armature is displaced from its normal position corresponding to a horizontal position of said balanced beam; means for mechanically counterbalancing the electromagnetic forces generated by said receiver coils so as to allow the receiver armature to follow the transmitter armature in true electrical and mechanical null balance, said counterbalancing means comprising a weight rigidly suspended beneath the pivot of said beam and constructed and arranged to exert a counter-turning moment when said beam is tilted, and means for adjusting said weight vertically relative to said beam.

9. In a non-symmetrical electrical impedance circuit for remote quantitative indication of a variable condition, said circuit including a pair of transmitter coils having at least one transmitter armature mounted in operative juxtaposition thereto and a pair of receiver coils having at least one receiver armature mounted in operative juxtaposition thereto, a pivotally mounted balanced beam, suspension means connecting said receiver armature to one end of said balanced beam, means for moving said transmitter armature relative to said transmitter coils responsive to variations in said variable condition thereby to produce variations in electromagnetic force in the receiver coils and to cause corresponding movement of said receiver armature and tilting of said beam, the position of said receiver armature varying with the voltage applied to the circuit when said receiver armature is displaced from its normal position corresponding to a horizontal position of said balanced beam; means for mechanically counterbalancing the electromagnetic forces generated by said receiver coils so as to allow the receiver armature to follow the transmitter armature in true electrical and mechanical null balance, said counterbalancing means comprising a pendulum rigidly supported from said beam in right-angular relationship thereto and adapted to exert a turning moment on said beam counter to that exerted by said receiver armatures.

10. In a non-symmetrical electrical impedance circuit for remote quantitative indication of a variable condition, said circuit including a pair of transmitter coils having at least one transmitter armature mounted in operative juxtaposition thereto and a pair of receiver coils having at least one receiver armature mounted in operative juxtaposition thereto, a pivotally mounted balanced beam, suspension means connecting said receiver armature to one end of said balanced beam, means for moving said transmitter armature relative to said transmitter coils responsive to variations in said variable condition thereby to produce variations in electromagnetic force in the receiver coils and to cause corresponding movement of said receiver armature and tilting of said beam, the position of said receiver armature varying with the voltage applied to the circuit when said receiver armature is displaced from its normal position corresponding to a horizontal position of said balanced beam; means for mechanically counterbalancing the electromagnetic forces generated by said receiver coils so as to allow the receiver armature to follow the transmitter armature in true electrical and mechanical null balance, said counterbalancing means comprising a screw-threaded rod rigidly suspended from said beam in vertical alignment with the pivot thereof and a weight screw-threadedly carried by said rod and vertically adjustable therealong whereby a predetermined turning moment is exerted upon said beam when said beam is tilted by said receiver armatures, said predetermined turning moment being opposite to but smaller than the turning moment exerted upon said beam by said receiver armatures.

FRED J. CURRAN.

REFERENCES CITED

The following references are of record in the file of this patent:

UNITED STATES PATENTS

| Number | Name | Date |
| --- | --- | --- |
| 1,336,511 | Crowell | Apr. 13, 1920 |
| 1,391,911 | Simon | Sept. 27, 1921 |
| 2,072,223 | Scott | Mar. 2, 1937 |
| 2,414,086 | Brewer | Jan. 14, 1947 |

FOREIGN PATENTS

| Number | Country | Date |
| --- | --- | --- |
| 16,861 | France | Feb. 20, 1913 |
| 23,071 | Great Britain | 1914 |